US012798669B2

(12) United States Patent
Im

(10) Patent No.: US 12,798,669 B2
(45) Date of Patent: Nov. 17, 2026

(54) VEHICLE STATE VARIABLE ESTIMATOR OF HOST VEHICLE AND RACK TARGET POSITION DETERMINER FOR REAR WHEEL STEERING SYSTEM USING THE SAME

(71) Applicant: HL MANDO CORPORATION, Pyeongtaek-si (KR)

(72) Inventor: YongHyeon Im, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 19/029,022

(22) Filed: Jan. 17, 2025

(65) Prior Publication Data

US 2025/0326432 A1 Oct. 23, 2025

(30) Foreign Application Priority Data

Apr. 23, 2024 (KR) ........................ 10-2024-0053947

(51) Int. Cl.
*B62D 6/00* (2006.01)
*B62D 7/15* (2006.01)

(52) U.S. Cl.
CPC ............... *B62D 6/003* (2013.01); *B62D 7/15* (2013.01)

(58) Field of Classification Search
CPC .......... B62D 6/003; B62D 7/15; B62D 6/005; B62D 7/159; B62D 6/00; B62D 5/046; B62D 6/002; B60W 40/103; B60W 40/105; B60W 2050/0052; B60W 2520/10; B60W 2520/14
See application file for complete search history.

(56) References Cited

U.S. PATENT DOCUMENTS

2020/0164914 A1* 5/2020 Kim ..................... B62D 5/0466

FOREIGN PATENT DOCUMENTS

JP 2021165063 A * 10/2021

OTHER PUBLICATIONS

Machine Translation of JP 2021165063 A PDF File Name: “JP2021165063A_Machine_Translation.pdf” (Year: 2021).*

* cited by examiner

*Primary Examiner* — Grant Moubry
*Assistant Examiner* — Ruben Picon-Feliciano
(74) *Attorney, Agent, or Firm* — Studebaker Brackett PLLC

(57) ABSTRACT

The present disclosure relates to a device for estimating a vehicle state variable of a host vehicle. The device includes at least: a first sensor configured to detect a first yaw rate of the host vehicle; a second sensor configured to detect a velocity of the host vehicle; and a controller configured to estimate the vehicle state variable. The controller is further configured to: estimate a second yaw rate of the host vehicle; calculate a first gain for correcting a difference between the first yaw rate and the second yaw rate; calculate an interpolation ratio that changes with the velocity; calculate a second gain by applying the interpolation ratio to the first gain; and estimate the vehicle state variable based on the second gain.

12 Claims, 5 Drawing Sheets

VEHICLE STATE VARIABLE ESTIMATOR OF HOST VEHICLE AND RACK TARGET POSITION DETERMINER FOR REAR WHEEL STEERING SYSTEM USING THE SAME

CROSS-REFERENCE TO RELATED APPLICATION

This application claims priority to and the benefit from Korean Patent Application No. 10-2024-0053947, filed on Apr. 23, 2024, the disclosures of which are incorporated herein by reference in its entirety.

BACKGROUND

The present disclosure relates to a vehicle state variable estimator of a host vehicle and a rack target position determiner of a rear wheel steering system using the same.

The rear wheel steering (RWS) system is a driver assistance system that aims to secure the vehicle's quick response by reducing the turning radius at low speeds and to increase turning stability at high speeds.

FIG. 1 is a drawing for explaining a general rear wheel steering control method.

Referring to FIG. 1, a typical rear wheel steering control method is a feed forward control method that determines the rack target position value of the rear wheel steering system by using a specific ratio between the angles of the front and rear wheels, and controls the steering angles of the front and rear wheels by setting a ratio to make them reverse phase at low speeds and in phase at high speeds.

This control method must be tuned for each vehicle velocity to find the ratio that suits the vehicle characteristics and purpose. If the tuning values are not optimized, stable vehicle attitude control may not be possible.

In addition, if proper operation is not performed due to external disturbances (e.g., changes in the environment such as road surface or vehicle characteristics) during rear wheel steering control, it may cause the vehicle to become unstable and lead to a dangerous situation.

Therefore, to complement these problems, many studies have been conducted recently on methods for determining the rack target position value of the rear wheel steering system based on a vehicle state feedback control method. The vehicle state variables used in this vehicle state feedback control include yaw rate and lateral slip angle (or lateral velocity), and among these, the lateral slip angle and lateral velocity are not easy to measure, and adding a sensor for measurement causes a cost problem.

In general, vehicle state estimators often use methods based on dynamic models, and the vehicle state is estimated by minimizing the difference between the sensor and the estimation model.

This approach may result in poor performance due to differences between the model and the actual system (due to assumptions made in the model design, model inaccuracies, etc.). In particular, dynamic models frequently used for estimating lateral slip angle or lateral velocity have difficulty accurately simulating real systems due to real-time changes in the model depending on changes in vehicle velocity, assumption of linear tire models, and model design that does not consider disturbances.

To compensate for this, nonlinear tire models or nonlinear Kalman filters or the like may be utilized, but there is a problem that they are difficult to implement and apply in practice and have a high computational load, making them difficult to apply at an level.

The present disclosure proposes an algorithm capable of estimating the state of a vehicle using only the vehicle's internal Controller Area Network (CAN) signal without adding a separate sensor, while solving the problems mentioned above.

SUMMARY

The present disclosure is to solve the above problems, and can accurately estimate a lateral velocity or a lateral slip angle, which is a state of a vehicle, without an additional sensor through a vehicle state variable estimator based on a linear parameter varying technique, and aims to determine a rear wheel rack target position value using the estimated lateral velocity and lateral slip angle.

The problems of the present disclosure are not limited to those mentioned above, and other problems not mentioned will be clearly understood by those of ordinary skill in the art from the following description.

In order to solve the above-mentioned problems, in some embodiments, the present disclosure includes a device for estimating a vehicle state variable of a host vehicle, the device including a first sensor configured to detect a first yaw rate of the host vehicle; a second sensor configured to detect a velocity of the host vehicle; and a controller configured to estimate the vehicle state variable, wherein the controller is further configured to: estimate a second yaw rate of the host vehicle; calculate a first gain for correcting a difference between the first yaw rate and the second yaw rate; calculate an interpolation ratio that changes with the velocity; calculate a second gain by applying the interpolation ratio to the first gain; and estimate the vehicle state variable based on the second gain.

In some embodiments, the present disclosure includes a device for determining a rack target position of a rear wheel steering system of a host vehicle, the device including a first sensor configured to detect a first yaw rate of the host vehicle; a second sensor configured to detect a velocity of the host vehicle; and a controller communicatively connected to the first sensor and the second sensor, wherein the controller is further configured to: estimate a second yaw rate of the host vehicle; calculate a first gain for correcting a difference between the first yaw rate and the second yaw rate; calculate an interpolation ratio that changes with the velocity; calculate a second gain by applying the interpolation ratio to the first gain; and determine the rack target position based on the second gain.

According to the present disclosure, a lateral velocity or a lateral slip angle, which is a state of a vehicle, can be accurately estimated without an additional sensor through a vehicle state variable estimator based on a linear parameter varying technique, and a filtering effect can be provided for the yaw rate.

In addition, according to the present disclosure, the difference between the vehicle model and the actual vehicle can be calculated in the form of disturbance and used in various ways in subsequent control and additional functions, such as determining changes in the driving environment such as changes in the road surface and compensating for control inputs.

In addition, according to the present disclosure, since the parameters required for the operation are calculated and applied in an offline environment, there are few operations compared to the Kalman filter, which requires a lot of matrix operations in real time or a nonlinear tire model, so it can be sufficiently applied at the ECU level.

In addition, according to the present disclosure, even when the lateral velocity or lateral slip angle can be measured using the sensor, the vehicle state variable estimator of the present disclosure can be used together to ensure the normal operation of the rear wheel steering system even in sensor failure situations.

Advantageous effects of the present disclosure are not limited to the above-described effects, and should be understood to include all effects that can be inferred from the configuration of the disclosure described in the detailed description or claims of the present disclosure.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

and

Figure 6:
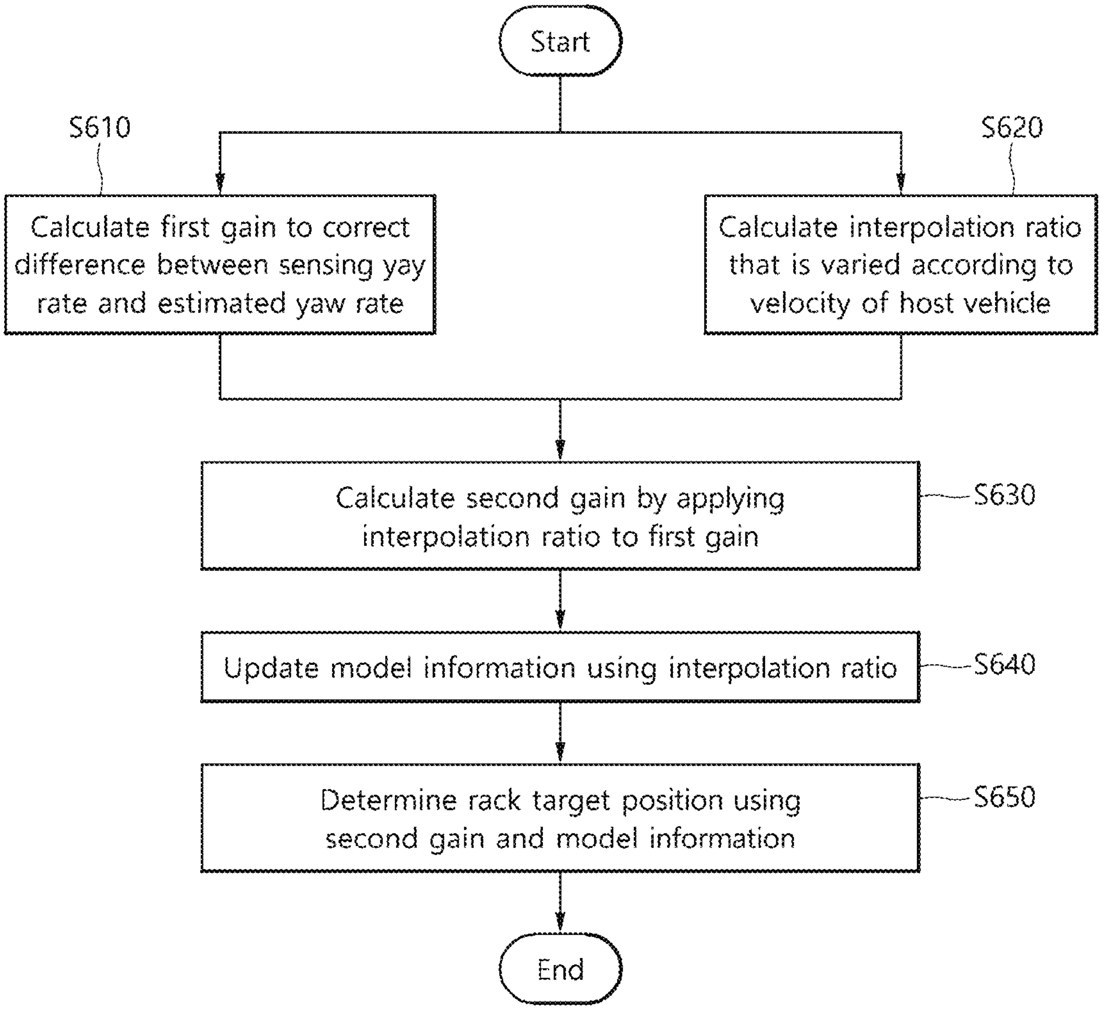

FIG. 6 is a flowchart showing a method for determining a rack target position of a rear wheel steering system of a host vehicle according to an exemplary embodiment of the present disclosure.

DETAILED DESCRIPTION

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used in the specification and the claims are not limitedly construed as their ordinary or dictionary meanings, and should be construed as meaning and concept consistent with the technical spirit of the present disclosure in accordance with the principle that the inventors can define terms and concepts in order to best describe their disclosure.

In the specification, it should be understood that the terms such as "comprise" or "have" are intended to specify the presence of features, numbers, steps, operations, components, parts, or combinations thereof described in the specification and do not preclude the possibility of the presence or addition of one or more other features, numbers, steps, operations, components, parts, or combinations thereof.

Figure 1:
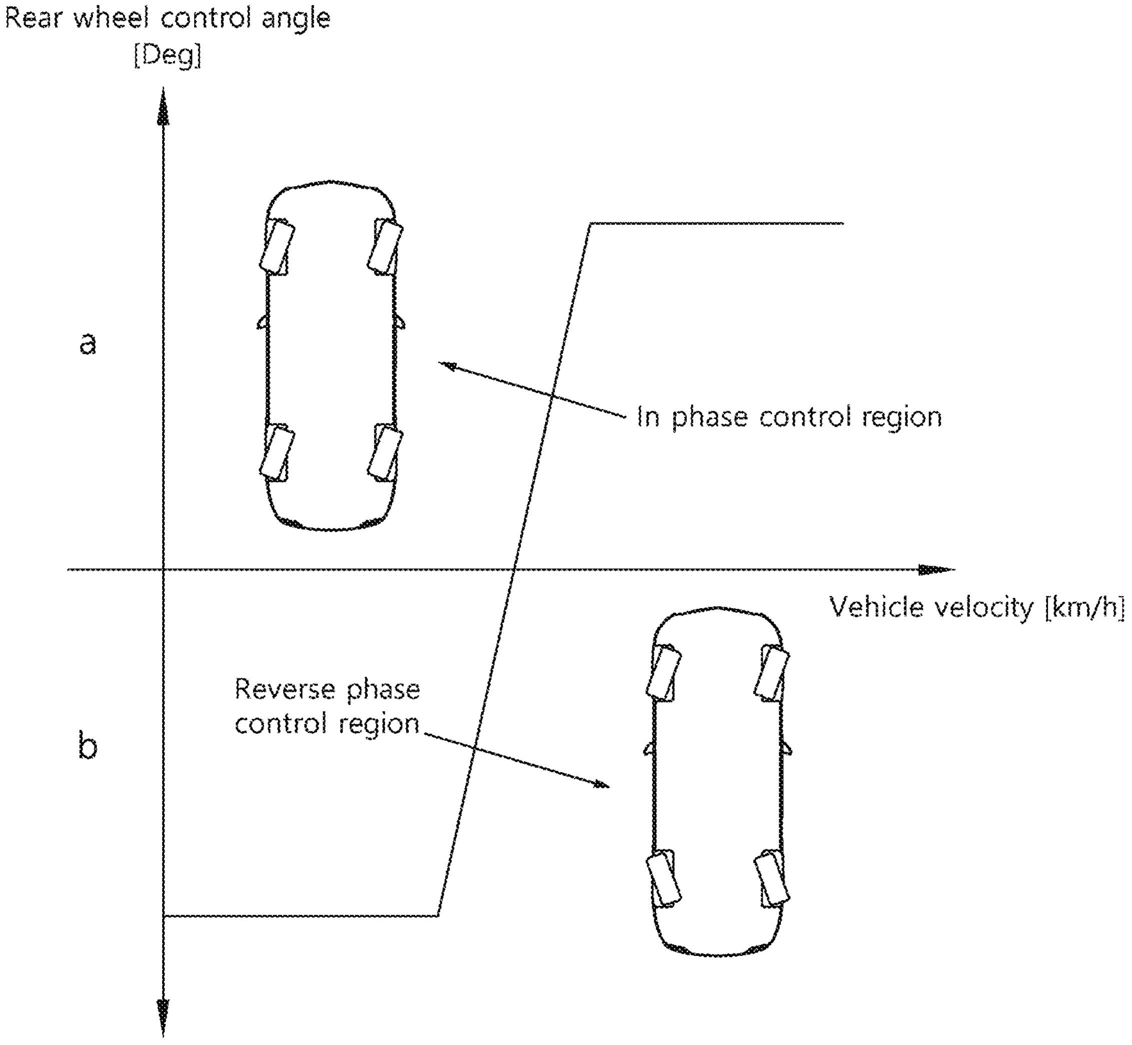
FIG. 1 is a drawing for explaining the operation of a typical rear wheel steering system.
Figure 2:
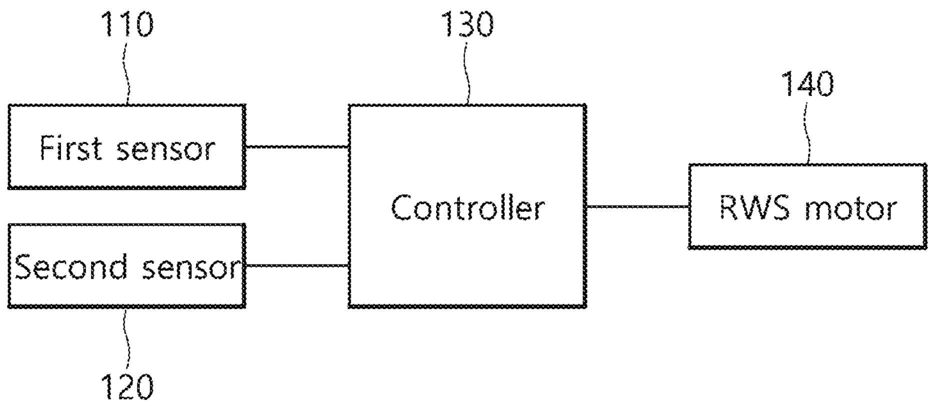
FIG. 2 is a block diagram of a rear wheel steering system according to an exemplary embodiment of the present disclosure.

FIG. 2 is a block diagram of a rear wheel steering system according to an exemplary embodiment of the present disclosure.

As shown in FIG. 2, the rear wheel steering (RWS) system according to an exemplary embodiment of the present disclosure may include a first sensor 110, a second sensor 120, a controller 130 and an RWS motor 140.

The first sensor 110 may detect the yaw rate of the host vehicle, and the second sensor 120 may detect the velocity of the host vehicle.

In addition to the first sensor 110 and the second sensor 120, the present disclosure may further include a sensor for detecting front wheel and rear wheel steering angles, and a sensor for detecting lateral acceleration.

The controller 130 is communicatively connected to the first sensor 110 and the second sensor 120, may estimate a vehicle state variable of the host vehicle, determine a rack target position of the rear wheel steering system using the vehicle state variable, and control the RWS motor 140 based on the rack target position to move the rack. In some embodiments, the controller 130 comprises a processor, which is a hardware element.

Figure 3:
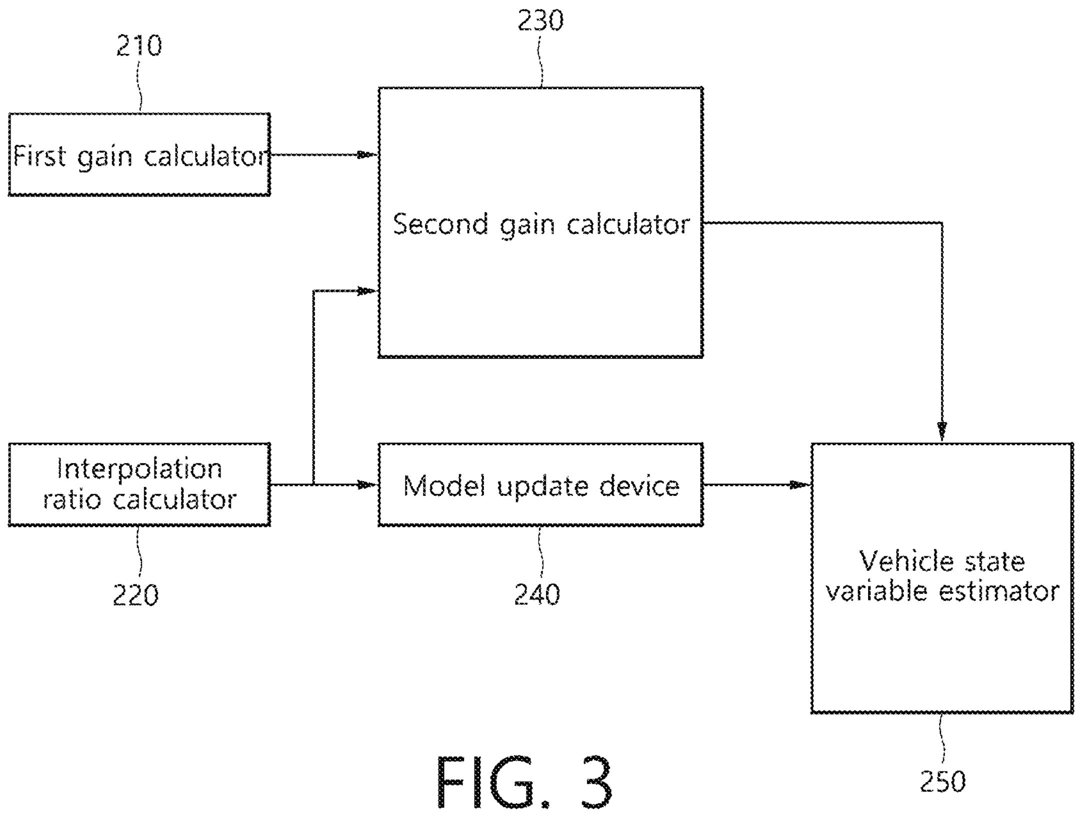
FIG. 3 is a block diagram of a controller according to a first embodiment of the present disclosure.

FIG. 3 is a block diagram of a controller according to a first embodiment of the present disclosure.

The controller 130 according to the first embodiment of the present disclosure operates as a vehicle state variable estimator of the host vehicle.

The controller 130 according to the first embodiment of the present disclosure is directed to provide a vehicle state variable estimator that accurately estimates the state and disturbance of the vehicle required for rear wheel steering control using only the internal CAN signal without adding a separate sensor, and is robust to various problems that may arise due to the difference between the estimation model and the actual vehicle.

As shown in FIG. 3, the controller 130 according to the first embodiment of the present disclosure may include a first gain calculator 210, an interpolation ratio calculator 220, a second gain calculator 230, a model update device 240, and a vehicle state variable estimator 250.

The first gain calculator 210 may calculate a first gain (estimator gain) for correcting a difference between a sensing yaw rate of the host vehicle and an estimated yaw rate of the host vehicle detected by the first sensor 110. Here, the estimated yaw rate may be estimated by the vehicle state variable estimator 250.

The vehicle state variable estimator 250 operates based on a dynamic model and may estimate the vehicle state variable in a manner that minimizes the difference between the sensing value and the estimated value, and for this purpose may include an estimation model for estimating the vehicle state variable.

Here, vehicle state variables may include yaw rate, lateral velocity, lateral slip angle, and disturbances.

For example, the vehicle state variable estimator 250 may estimate the yaw rate by inputting a sensing value of the rear wheel steering angle to the estimation model.

Meanwhile, in order to determine the rack target position of the rear wheel steering system, the yaw rate and the lateral velocity (or the lateral slip angle) of the host vehicle are required. However, the lateral velocity or lateral slip angle of the host vehicle is not easy to measure, and adding a sensor for measurement causes a cost problem.

In order to solve such a problem, the present disclosure estimates the lateral velocity or the lateral slip angle of the host vehicle using an estimation model.

The estimation model may store at least one model information. Here, the model information is varied according to the velocity of the host vehicle.

Accordingly, the present disclosure may estimate the lateral velocity or the lateral slip angle according to the velocity of the host vehicle by varying the model information of the estimation model according to the velocity of the host vehicle.

The first gain calculator 210 may calculate a first gain using a Kalman filter. Here, the Kalman filter uses an algorithm for estimating or controlling the state of the system from observations with errors (disturbances). That is, the Kalman filter may estimate the optimal state through the sensing value and the estimated value.

The first gain calculator 210 may calculate the first gain by inputting model information of the estimation model included in the vehicle state variable estimator 250 to the Kalman filter.

Specifically, the first gain ($K_1$, $K_2$, $K_3$, $K_4$) may be calculated by Equation 1 below.

[Equation 1]

$$K_1 = \text{kalman}(A_{a,LPV1}, C_{a,LPV1}, W, V),\ K_2 = \text{kalman}(A_{a,LPV2}, C_{a,LPV2}, W, V)$$

$$K_3 = \text{kalman}(A_{a,LPV3}, C_{a,LPV3}, W, V),\ K_4 = \text{kalman}(A_{a,LPV4}, C_{a,LPV4}, W, V)$$

Where, $A_a$ and $C_a$ are model information of an estimation model for estimating a vehicle state variable, and W and C are parameters necessary to calculate the first gain ($K_1$, $K_2$, $K_3$, $K_4$) with a Kalman filter.

The first gain ($K_1$, $K_2$, $K_3$, $K_4$) means a gain for the maximum velocity, the minimum velocity, the reciprocal of the maximum speed, and the reciprocal of the minimum speed of the host vehicle, respectively, and the difference between the sensing yaw rate and the estimated yaw rate is reflected.

The interpolation ratio calculator 220 may calculate an interpolation ratio that changes according to the velocity of the host vehicle detected by the second sensor 120.

Specifically, the interpolation ratio ($\zeta$) may be calculated by Equation 2 below.

[Equation 2]

$$\zeta = \begin{bmatrix} \zeta_1 \\ \zeta_2 \\ \zeta_3 \\ \zeta_4 \end{bmatrix} = \hat{V}^{-1} \begin{bmatrix} \lambda_1(V_{x,current}) - \lambda_{1n} \\ \lambda_2(V_{x,current}) - \lambda_{2n} \\ 0.5 \\ 0.5 \end{bmatrix} =$$

$$\begin{bmatrix} \frac{1}{V_{x,max}} & \frac{1}{V_{x,min}} & 0 & 0 \\ 0 & 0 & V_{x,min} & V_{x,max} \\ 1 & 1 & 0 & 0 \\ 0 & 0 & 1 & 1 \end{bmatrix}^{-1} \begin{bmatrix} \lambda_1(V_{x,current}) - \lambda_{1n} \\ \lambda_2(V_{x,current}) - \lambda_{2n} \\ 0.5 \\ 0.5 \end{bmatrix},$$

$$\lambda_1(V_x) = \frac{1}{V_x}: \frac{1}{V_{x,max}} \le \lambda_1(V_x) \le \frac{1}{V_{x,min}}$$

$$\lambda_2(V_x) = V_x: \frac{1}{V_{x,min}} \le \lambda_2(V_x) \le V_{x,max}$$

Where, $V_{x,max}$ is the set maximum velocity of the host vehicle, $V_{x,min}$ is the set minimum velocity of the host vehicle, and $V_{x,current}$ is the current velocity of the host vehicle. In addition, $\zeta_1$, $\zeta_2$, $\zeta_3$, and ζ4 mean interpolation ratios to the maximum velocity, the minimum velocity, the reciprocal of the maximum velocity, and the reciprocal of the minimum velocity, respectively. In addition, $\lambda_{1n}$ means the average of the maximum velocity and the minimum velocity of the host vehicle, and $\lambda_{2n}$ means the average of the reciprocal of the maximum velocity and the reciprocal of the minimum velocity of the host vehicle.

In addition, $\zeta_1$, $\zeta_2$, $\zeta_3$, and $\zeta_4$ have values between 0 and 1, and the sum of $\zeta_1$, $\zeta_2$, $\zeta_3$, and $\zeta_4$ is 1.

The second gain calculator 230 may calculate a second gain (interpolated estimator gain) by applying the interpolation ratio ($\zeta$) to the first gain (estimator gain).

Specifically, the second gain ($K(V_{x,cur})$) may be calculated by Equation 3 below.

[Equation 3]

$$K(V_{x,cur}) = [K_1\ \ K_2\ \ K_3\ \ K_4] \begin{bmatrix} \zeta_1 \\ \zeta_2 \\ \zeta_3 \\ \zeta_4 \end{bmatrix}$$

That is, the second gain ($K(V_{x,cur})$) reflecting the interpolation ratio ($\zeta$) to the first gain ($K_1$, $K_2$, $K_3$, $K_4$) may be calculated based on the current vehicle velocity of the host vehicle.

The second gain calculator 230 may provide the calculated second gain ($K(V_{x,cur})$) to the vehicle state variable estimator 250.

The model update device 240 may update model information of the estimation model using the interpolation ratio ($\zeta$).

Specifically, the model information ($A_a(V_{x,cur})$, $C_a(V_{x,cur})$) according to the current velocity of the host vehicle may be updated by Equation 4 below.

[Equation 4]

$$A_a(V_{x,cur}) = \zeta_1 A_{a,LPV1} + \zeta_2 A_{a,LPV2} + \zeta_3 A_{a,LPV3} + \zeta_4 A_{a,LPV4}$$

$$C_a(V_{x,cur}) = \zeta_1 C_{a,LPV1} + \zeta_2 C_{a,LPV2} + \zeta_3 C_{a,LPV3} + \zeta_4 C_{a,LPV4}$$

The model update device 240 may provide updated model information ($A_a(V_{x,cur})$, $C_a(V_{x,cur})$) to the vehicle state variable estimator 250.

The vehicle state variable estimator 250 may estimate the vehicle state variable based on the second gain ($K(V_{x,cur})$) provided from the second gain calculator 230 and the model information ($A_a(V_{x,cur})$, $C_a(V_{x,cur})$) provided from the model update device 240. Here, the vehicle state variable may be a lateral velocity or a lateral slip angle of the host vehicle.

The vehicle state variable may be calculated based on the vehicle state variable change amount. That is, the current vehicle state variable may be calculated by reflecting the vehicle state variable change amount to the previously estimated vehicle state variable. Here, the current vehicle state variable may be the lateral velocity of the host vehicle.

Specifically, the vehicle state variable change amount ($\dot{\hat{x}}_a$) may be calculated by Equation 5 below.

[Equation 5]

$$\dot{\hat{x}}_a = A_a(V_{x.cur})\hat{x}_a + B_a u + K(V_{x.cur})(y - \hat{y}) =$$

$$A_a(V_{x.cur})\hat{x}_a + B_a u + K(V_{x.cur})\{y - (C_a(V_{x.cur})\hat{x}_a + Du)\}$$

Where, $\hat{x}_a$ is a previously estimated vehicle state variable, u is a value input to the estimation model and may be a rear wheel steering angle, $B_a$ is a gain matrix of the rear wheel steering angle, y is a sensing yaw rate, and ŷ is an estimated yaw rate. And, D is a gain needed to calculate the rear wheel steering angle.

Referring to Equation 5, the vehicle state variable may be accurately calculated by correcting the model using the difference value between the sensing yaw rate and the estimated yaw rate.

Meanwhile, if the vehicle state variable is the lateral velocity ($V_y$) of the host vehicle, the lateral slip angle (β) of the host vehicle may be calculated by Equation 6 below.

$$\beta = \tan^{-1}\left(\frac{V_y}{V_x}\right) \approx \frac{V_y}{V_x} \quad \text{[Equation 6]}$$

Where, $V_x$ is the velocity of the host vehicle, that is, the longitudinal velocity.

According to the above-described first embodiment of the present disclosure, a lateral velocity or a lateral slip angle, which is a state of a vehicle, may be accurately estimated without an additional sensor through a vehicle state variable estimator based on a linear parameter varying technique, and a filtering effect may be provided for the yaw-rate.

In addition, according to the first embodiment of the present disclosure, the difference between the vehicle model and the actual vehicle can be calculated in the form of disturbance and used in various ways in subsequent control and additional functions, such as determining changes in the driving environment such as changes in the road surface and compensating for control inputs.

In addition, according to the first embodiment of the present disclosure, since the parameters required for the operation are calculated and applied in an offline environment, there are few operations compared to the Kalman filter, which requires a lot of matrix operations in real time or a nonlinear tire model, so it can be sufficiently applied at the ECU level.

In addition, according to the first embodiment of the present disclosure, even when the lateral velocity or lateral slip angle can be measured using the sensor, the vehicle state variable estimator of the present disclosure can be used together to ensure the normal operation of the rear wheel steering system even in sensor failure situations.

Figure 4:
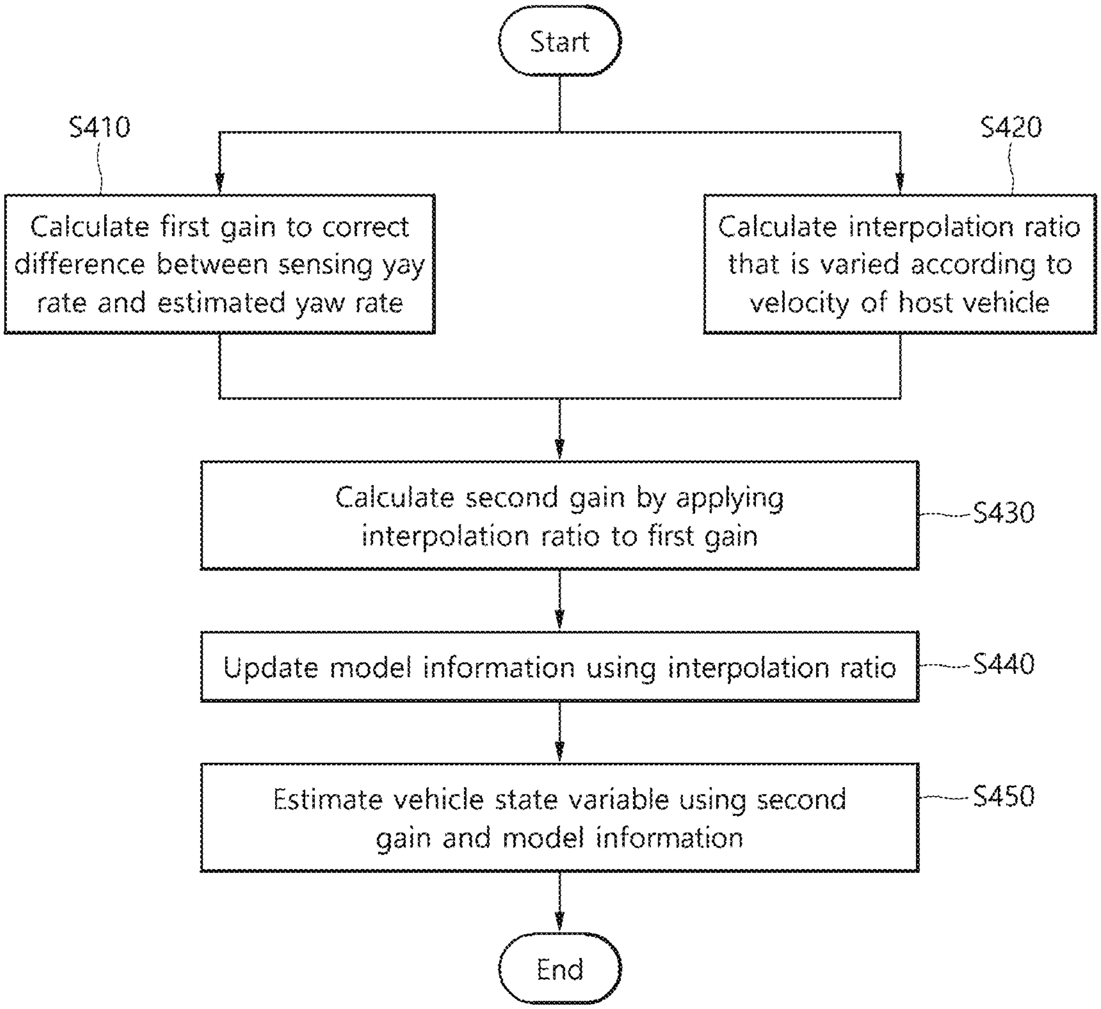
FIG. 4 is a flowchart of a method for estimating a vehicle state variable of a host vehicle according to an exemplary embodiment of the present disclosure.

FIG. 4 is a flowchart of a method for estimating a vehicle state variable of a host vehicle according to an exemplary embodiment of the present disclosure; and Hereinafter, a method for estimating a vehicle state variable of a host vehicle according to an exemplary embodiment of the present disclosure will be described with reference to FIG. 4, but the same contents as those described above will be omitted.

The present disclosure is a method for estimating a vehicle state variable used to determine a rack target position of a rear wheel steering system of a host vehicle using the controller 130, and first, a first gain is calculated to correct the difference between the sensing yaw rate of the host vehicle and the estimated yaw rate of the host vehicle detected by the first sensor 110 (S410).

In this case, the first gain may be calculated using the Kalman filter. That is, the first gain may be calculated by inputting model information of the estimation model for estimating the vehicle state variable to the Kalman filter.

Here, the estimation model may store at least one piece of model information that is varied according to the velocity of the host vehicle.

Then, an interpolation ratio that changes according to the velocity of the host vehicle detected by the second sensor 120 is calculated (S420).

Next, a second gain is calculated by applying the interpolation ratio to the first gain (S430). That is, a second gain in which the interpolation ratio is reflected in the first gain is calculated based on the current vehicle velocity of the host vehicle.

Next, model information included in the estimation model is updated using the interpolation ratio (S440).

Next, a vehicle state variable is estimated based on the second gain and the model information (S450). Here, the vehicle state variable may be a lateral velocity or a lateral slip angle of the host vehicle.

According to the above-described method for estimating a vehicle state variable of a host vehicle according to an exemplary embodiment of the present disclosure, a lateral velocity or a lateral slip angle, which is a state of a vehicle, may be accurately estimated without an additional sensor through a vehicle state variable estimator based on a linear parameter varying technique, and a filtering effect may be provided for the yaw rate.

In addition, according to the method for estimating a vehicle state variable of a host vehicle according to an exemplary embodiment of the present disclosure, the difference between the vehicle model and the actual vehicle can be calculated in the form of disturbance and used in various ways in subsequent control and additional functions, such as determining changes in the driving environment such as changes in the road surface and compensating for control inputs.

In addition, according to the method for estimating a vehicle state variable of a host vehicle according to an exemplary embodiment of the present disclosure, since the parameters required for the operation are calculated and applied in an offline environment, there are few operations compared to the Kalman filter, which requires a lot of matrix operations in real time or a nonlinear tire model, so it can be sufficiently applied at the ECU level.

In addition, according to the method for estimating a vehicle state variable of a host vehicle according to an exemplary embodiment of the present disclosure, even when the lateral velocity or lateral slip angle can be measured using the sensor, the vehicle state variable estimator of the present disclosure can be used together to ensure the normal operation of the rear wheel steering system even in sensor failure situations.

Figure 5:
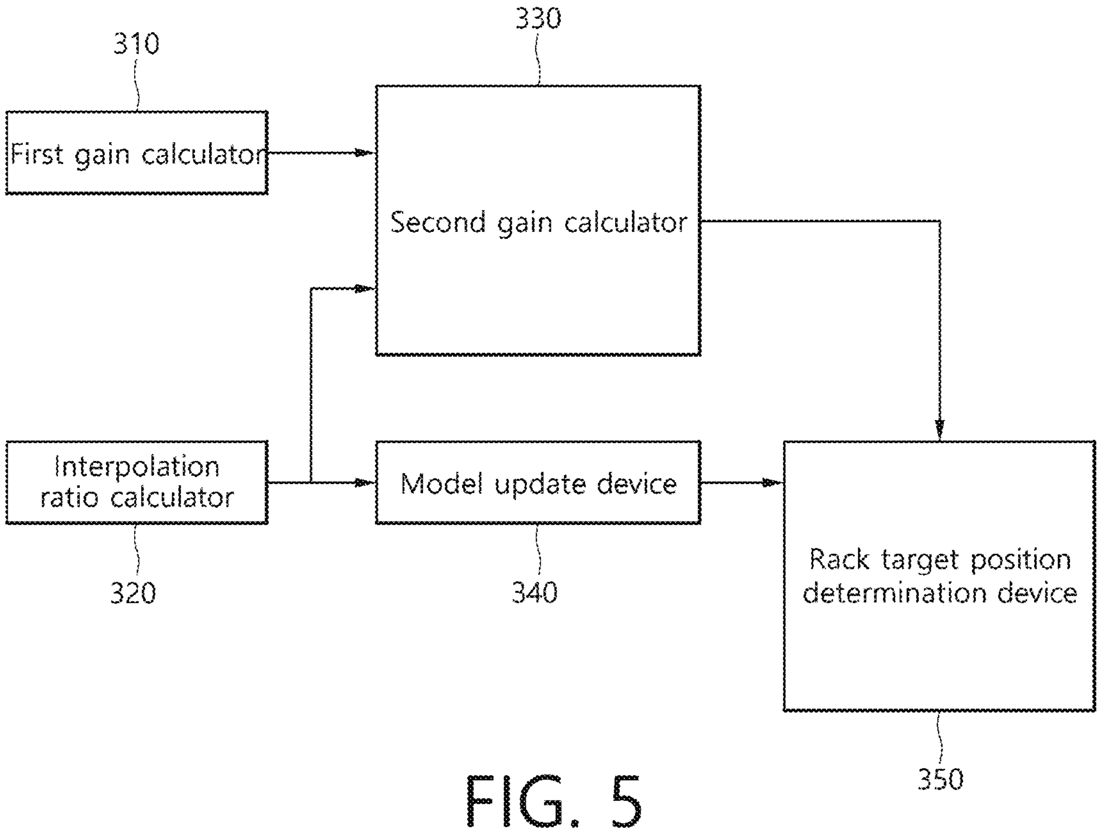
FIG. 5 is a block diagram of a controller according to a second embodiment of the present disclosure.

FIG. 5 is a block diagram of a controller according to a second embodiment of the present disclosure.

The controller 130 according to the second embodiment of the present disclosure operates as a rack target position determiner of a rear wheel steering system of the host vehicle.

The controller 130 according to the second embodiment of the present disclosure aims to determine a rack target position of a rear wheel steering system capable of optimal performance in the current state in consideration of a change in the model due to a change in the velocity of the host vehicle and a disturbance acting on the vehicle.

As shown in FIG. 5, the controller 130 according to the second embodiment of the present disclosure may include a first gain calculator 310, an interpolation ratio calculator 320, a second gain calculator 330, a model update device 340, and a rack target position determination device 350.

The first gain calculator 310 may calculate a first gain (estimator gain) for correcting a difference between a sensing yaw rate of the host vehicle and an estimated yaw rate of the host vehicle detected by the first sensor 110. Here, the estimated yaw rate may be estimated by the rack target position determination device 350.

The rack target position determination device 350 operates based on a dynamic model and can estimate the vehicle state variable in a way that minimizes the difference between the sensing value and the estimated value, and can use this to estimate the rack target position of the rear wheel steering system, and to this end, include a decision model for determining the rack target position.

Here, vehicle state variables may include yaw rate, lateral velocity, lateral slip angle, and disturbances.

For example, the rack target position determination device 350 may estimate the yaw rate by inputting a sensing value of the rear wheel steering angle to the estimation model.

Meanwhile, in order to determine the rack target position of the rear wheel steering system, the yaw rate and the lateral velocity (or the lateral slip angle) of the host vehicle are required. However, the lateral velocity or lateral slip angle of the host vehicle is not easy to measure, and adding a sensor for measurement causes a cost problem.

In order to solve such a problem, the present disclosure estimates the lateral velocity or the lateral slip angle of the host vehicle using a decision model.

The decision model may store at least one model information. Here, the model information is varied according to the velocity of the host vehicle.

Accordingly, the present disclosure may estimate the lateral velocity or the lateral slip angle according to the velocity of the host vehicle by varying the model information of the decision model according to the velocity of the host vehicle, and use this to determine the rack target position of the rear wheel steering system.

The first gain calculator 310 may calculate a first gain using a linear quadratic regulator (LQR) controller. Here, the LQR controller is a controller that reduces the error (disturbance) between the sensing value and the estimated value by obtaining a gain that minimizes the objective function by having the objective function of the sensing value and the estimated value.

The first gain calculator 310 may calculate the first gain (control gain) by inputting model information of the decision model included in the rack target position determination device 350 to the LQR controller.

Specifically, the first gain ($K_{c1}$, $K_{c2}$, $K_{c3}$, $K_{c4}$) may be calculated by Equation 7 below.

[Equation 7]

$$K_{c1} = lqr(A_{LPV1}, B_r, Q, R),\ K_{c2} = lqr(A_{LPV2}, B_r, Q, R)$$
$$K_{c3} = lqr(A_{LPV3}, B_r, Q, R),\ K_{c4} = lqr(A_{LPV4}, B_r, Q, R)$$

Where, A is model information of a decision model for estimating a rack target position, $B_r$ is a gain matrix required to calculate a model input value, for example, a rear wheel steering angle, and Q and R are parameters required to calculate the first gain ($K_{c1}$, $K_{c2}$, $K_{c3}$, $K_{c4}$) with an LQR controller.

The first gain ($K_{c1}$, $K_{c2}$, $K_{c3}$, $K_{c4}$) means a gain for the maximum velocity, the minimum velocity, the reciprocal of the maximum speed, and the reciprocal of the minimum speed of the host vehicle, respectively, and the difference between the sensing yaw rate and the estimated yaw rate is reflected.

The interpolation ratio calculator 320 may calculate an interpolation ratio that changes according to the velocity of the host vehicle detected by the second sensor 120.

Specifically, the interpolation ratio ($\zeta$) may be calculated by Equation 8 below.

[Equation 8]

$$\zeta = \begin{bmatrix} \zeta_1 \\ \zeta_2 \\ \zeta_3 \\ \zeta_4 \end{bmatrix} = \hat{V}^{-1} \begin{bmatrix} \lambda_1(V_{x,current}) - \lambda_{1n} \\ \lambda_2(V_{x,current}) - \lambda_{2n} \\ 0.5 \\ 0.5 \end{bmatrix} =$$

$$\begin{bmatrix} \frac{1}{V_{x,max}} & \frac{1}{V_{x,min}} & 0 & 0 \\ 0 & 0 & V_{x,min} & V_{x,max} \\ 1 & 1 & 0 & 0 \\ 0 & 0 & 1 & 1 \end{bmatrix}^{-1} \begin{bmatrix} \lambda_1(V_{x,current}) - \lambda_{1n} \\ \lambda_2(V_{x,current}) - \lambda_{2n} \\ 0.5 \\ 0.5 \end{bmatrix},$$

$$\lambda_1(V_x) = \frac{1}{V_x}: \frac{1}{V_{x,max}} \le \lambda_1(V_x) \le \frac{1}{V_{x,min}}$$

$$\lambda_2(V_x) = V_x: \frac{1}{V_{x,min}} \le \lambda_2(V_x) \le \frac{1}{V_{x,max}}$$

Where, $V_{x,max}$ is the set maximum velocity of the host vehicle, $V_{x,min}$ is the set minimum velocity of the host vehicle, and $V_{x,current}$ is the current velocity of the host vehicle. In addition, $\zeta_1$, $\zeta_2$, $\zeta_3$, and $\zeta_4$ mean interpolation ratios to the maximum velocity, the minimum velocity, the reciprocal of the maximum velocity, and the reciprocal of the minimum velocity, respectively. In addition, $\lambda_{1n}$ means the average of the maximum velocity and the minimum velocity of the host vehicle, and $\lambda_{2n}$ means the average of the reciprocal of the maximum velocity and the reciprocal of the minimum velocity of the host vehicle.

In addition, $\zeta_1$, $\zeta_2$, $\zeta_3$, and $\zeta_4$ have values between 0 and 1, and the sum of $\zeta_1$, $\zeta_2$, $\zeta_3$, and $\zeta_4$ is 1.

The second gain calculator 330 may calculate a second gain (interpolated control gain) by applying the interpolation ratio ($\zeta$) to the first gain (control gain).

Specifically, the second gain ($K_c(V_{x,cur})$) may be calculated by Equation 9 below.

[Equation 9]

$$K_c(V_{x,cur}) = [K_{c1}\ \ K_{c2}\ \ K_{c3}\ \ K_{c4}] \begin{bmatrix} \zeta_1 \\ \zeta_2 \\ \zeta_3 \\ \zeta_4 \end{bmatrix}$$

That is, the second gain ($K_c(V_{x,cur})$) reflecting the interpolation ratio ($\zeta$) to the first gain ($K_{c1}$, $K_{c2}$, $K_{c3}$, $K_{c4}$) may be calculated based on the current vehicle velocity of the host vehicle.

The second gain calculator 330 may provide the calculated second gain ($K_c(V_{x,cur})$) to the rack target position determination device 350.

The model update device 340 may update model information of the decision model using the interpolation ratio ($\zeta$).

Specifically, the model information ($A(V_{x,cur})$) according to the current velocity of the host vehicle may be updated by Equation 10 below.

[Equation 10]

$$A(V_{x,cur}) = \zeta_1 A_{LPV1} + \zeta_2 A_{LPV2} + \zeta_3 A_{LPV3} + \zeta_4 A_{LPV4}$$

The model update device 340 may provide updated model information ($A(V_{x,cur})$) to the rack target position determination device 350.

The rack target position determination device 350 may determine the rack target position based on the second gain ($K_c(V_{x,cur})$) provided from the second gain calculator 330 and the model information ($A(V_{x,cur})$) provided from the model update device 340.

The rack target position may be calculated using the difference between the target rack position change amount and the actual rack position change amount.

Specifically, the target rack position change amount ($\dot{x}_{ref}$) may be calculated by Equation 11 below.

$$\dot{x}_{ref} = A(V_x)\,x_{ref} + B_f\delta_f + B_r\delta_{r,des} \quad \text{[Equation 11]}$$

Where, $A(V_x)$ is updated model information according to the velocity of the host vehicle, $x_{ref}$ is a target rack position, $\delta_f$ is a front wheel steering angle, $B_f$ is a gain matrix of the front wheel steering angle, $\delta_r$ is a rear wheel steering angle, and $B_r$ is a gain matrix of the rear wheel steering angle.

The actual rack position change amount ($\dot{x}$) may be calculated by Equation 12 below.

$$\dot{x} = A(V_x)\,x + B_f\delta_f + B_r u + B_d\tau_d \quad \text{[Equation 12]}$$

Where, x is a current rack position, u is a rear wheel steering angle, $\tau_d$ is a disturbance value that generates the error measured by the sensor and the value estimated by the decision model, and $B_d$ is a gain matrix for reflecting the disturbance value in the decision model.

The current rack position (x) reflects the estimated lateral velocity or lateral slip angle.

The difference ($\dot{e}$) between the target rack position change amount and the actual rack position change amount may be calculated by Equation 13 below.

$$\dot{e} = A(V_x)e + B_r(\delta_{r,des} - u) - B_d\tau_d = A(V_x)e - B_rK_c(V_x)\,e \quad \text{[Equation 13]}$$

Where, e is a difference value between a target rack position ($x_{ref}$) and a current rack position (x).

If Equation 13 is rearranged, it may be expressed by Equation 14.

$$u = B_r^+(B_r\delta_{r,des} - B_d\tau_d) + K_c(V_x)e \quad \text{[Equation 14]}$$

Where, u is a rear wheel target steering angle, and $$B_r^+$$

is a Pseudo Inverse of $B_r$.

When the rear wheel target steering angle (u) calculated in Equation 14 is applied to Equation 15 below, the rack target position ($x_{RWS}$) may be calculated.

$$x_{RWS} - C_{AtP} \cdot u \quad \text{[Equation 15]}$$

Where, $C_{AtP}$ is a rack conversion change ratio.

According to the above-described second embodiment of the present disclosure, it is possible to secure a control performance suitable for a response characteristic of a vehicle that changes in real time by a change in the velocity of the host vehicle through control based on a linear parameter varying technique.

In addition, according to the second embodiment of the present disclosure, since the parameters required for the operation are calculated and applied in an offline environment, there are few operations compared to the method of increasing control performance using a nonlinear model, so it can be sufficiently applied at the ECU level.

In addition, according to the second embodiment of the present disclosure, since the disturbance obtained by the controller can be reflected during rear wheel steering, it is possible to secure strong control performance against model uncertainty or changes in the driving environment (such as changes in the road surface).

FIG. 6 is a flowchart showing a method for determining a rack target position of a rear wheel steering system of a host vehicle according to an exemplary embodiment of the present disclosure.

Hereinafter, a method for determining a rack target position of a rear wheel steering system of a host vehicle according to an exemplary embodiment of the present disclosure will be described with reference to FIG. 6, but the same contents as those described above will be omitted.

The present disclosure is a method for determining a rack target position of a rear wheel steering system of a host vehicle using the controller 130, and first, a first gain is calculated to correct the difference between the sensing yaw rate of the host vehicle and the estimated yaw rate of the host vehicle detected by the first sensor 110 (S610).

In this case, the first gain may be calculated using a linear quadratic regulator (LQR) controller. That is, the first gain may be calculated by inputting model information of the decision model for determining the rack target position of the rear wheel steering system to the LQR controller.

Here, the decision model may store at least one piece of model information that is varied according to the velocity of the host vehicle.

Then, an interpolation ratio that changes according to the velocity of the host vehicle detected by the second sensor 120 is calculated (S620).

Next, a second gain is calculated by applying the interpolation ratio to the first gain (S630). That is, a second gain in which the interpolation ratio is reflected in the first gain is calculated based on the current vehicle velocity of the host vehicle.

Next, model information included in the decision model is updated using the interpolation ratio (S640).

Next, a rack target position of the rear wheel steering system is estimated based on the second gain and the model information (S650). Here, the estimated lateral velocity or the estimated lateral slip angle of the host vehicle is reflected in the rack target position.

In addition, according to the method for determining a rack target position of a rear wheel steering system of a host vehicle according to an exemplary embodiment of the present disclosure, since the parameters required for the operation are calculated and applied in an offline environment, there are few operations compared to the method of increasing control performance using a nonlinear model, so it can be sufficiently applied at the ECU level.

In addition, according to the method for determining a rack target position of a rear wheel steering system of a host vehicle according to an exemplary embodiment of the present disclosure, since the disturbance obtained by the controller can be reflected during rear wheel steering, it is possible to secure strong control performance against model uncertainty or changes in the driving environment (such as changes in the road surface).

It should be understood that the effects of the present disclosure are not limited to the above-described effects, and include all effects inferable from a configuration of the disclosure described in detailed descriptions or claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

What is claimed is:

1. A device for estimating a vehicle state variable to determine a rack target position of a rear wheel steering system of a host vehicle, the device comprising:

a first sensor configured to detect a first yaw rate of the host vehicle;

a second sensor configured to detect a velocity of the host vehicle; and a controller connected to the first sensor and the second sensor, and configured to estimate the vehicle state variable, wherein the controller comprises an estimation model having model information that varies according to the velocity of the host vehicle, and wherein the controller is further configured to:

estimate a second yaw rate of the host vehicle;

calculate a first gain for correcting a difference between the first yaw rate and the second yaw rate;

calculate an interpolation ratio that changes with the velocity of the host vehicle;

calculate a second gain by applying the interpolation ratio to the first gain;

update the model information of the estimation model using the interpolation ratio such that the estimation model is varied according to the velocity of the host vehicle; and estimate the vehicle state variable based on both the second gain and the updated model information of the estimation model.

2. The device of claim 1, wherein the controller is further configured to calculate the first gain using a Kalman filter.

3. The device of claim 2, wherein the controller is configured to calculate the first gain by inputting the model information to the Kalman filter.

4. The device of claim 1, wherein the vehicle state variable includes at least one of a lateral velocity of the host vehicle and a lateral slip angle of the host vehicle.

5. The device of claim 1, wherein the controller is further configured to:

determine the rack target position of the rear wheel steering system of the host vehicle based on the vehicle state variable; and control the rear wheel steering system according to the rack target position.

6. A device for determining a rack target position of a rear wheel steering system of a host vehicle, the device comprising:

a first sensor configured to detect a first yaw rate of the host vehicle;

a second sensor configured to detect a velocity of the host vehicle; and a controller connected to the first sensor and the second sensor, wherein the controller comprises an estimation model having model information that varies according to the velocity of the host vehicle, and wherein the controller is further configured to:

estimate a second yaw rate of the host vehicle;

calculate a first gain for correcting a difference between the first yaw rate and the second yaw rate;

calculate an interpolation ratio that changes with the velocity;

calculate a second gain by applying the interpolation ratio to the first gain;

update the model information of the estimation model using the interpolation ratio such that the estimation model is varied according to the velocity of the host vehicle; and determine the rack target position based on both the second gain and the updated model information of the estimation model.

7. The device of claim 6, wherein the controller is further configured to calculate the first gain using a Linear Quadratic Regulator (LQR) controller.

8. The device of claim 7, wherein the controller is configured to calculate the first gain by inputting the model information to the LQR controller.

9. The device of claim 6, wherein the controller is further configured to:

control the rear wheel steering system according to the rack target position.

10. The device of claim 1, wherein the first gain comprises a plurality of gains corresponding to a maximum velocity, a minimum velocity, and reciprocals thereof, and wherein the second gain is calculated by interpolating the plurality of gains based on the interpolation ratio.

11. The device of claim 1, wherein the interpolation ratio comprises a plurality of interpolation coefficients each having a value between 0 and 1 and summing to 1.

12. The device of claim 1, wherein the vehicle state variable includes at least one of a lateral velocity and a lateral slip angle estimated without an additional sensor.

* * * * *